US012559074B2

(12) United States Patent
Castro

(10) Patent No.: US 12,559,074 B2
(45) Date of Patent: Feb. 24, 2026

(54) AIRCRAFT SYSTEM

(71) Applicant: AIRBUS OPERATIONS LIMITED, Bristol (GB)

(72) Inventor: Carlos Cuesta Castro, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 892 days.

(21) Appl. No.: 17/385,231

(22) Filed: Jul. 26, 2021

(65) Prior Publication Data

US 2022/0097663 A1     Mar. 31, 2022

(30) Foreign Application Priority Data

Sep. 29, 2020     (GB) ...................................... 2015397

(51) Int. Cl.
B60T 8/32 (2006.01)

(52) U.S. Cl.
CPC .................................... B60T 8/325 (2013.01)

(58) Field of Classification Search
CPC .... B60T 8/325; B60T 2210/12; B60T 8/1703; B60T 8/18; B60T 8/176; B64C 25/44; B64C 25/46; B64C 25/42; B64D 45/00
See application file for complete search history.

(56) References Cited

U.S. PATENT DOCUMENTS

| | | | |
|---|---|---|---|
| 10,202,204 B1 * | 2/2019 | Daidzic ................... | B64D 45/04 |
| 2008/0154445 A1 * | 6/2008 | Goodman ............. | B60T 8/1703 |
| | | | 701/3 |
| 2013/0175403 A1 * | 7/2013 | Spray ................... | B60T 8/1703 |
| | | | 244/110 A |

| | | | |
|---|---|---|---|
| 2013/0261920 A1 | 10/2013 | Picaut et al. | |
| 2015/0129368 A1 * | 5/2015 | Cahill ..................... | F16D 65/14 |
| | | | 188/71.5 |
| 2015/0254990 A1 | 9/2015 | Raby et al. | |
| 2016/0016661 A1 * | 1/2016 | Howell .................... | B60T 8/00 |
| | | | 701/3 |
| 2017/0137144 A1 | 5/2017 | Georgin | |
| 2019/0054906 A1 * | 2/2019 | Pedapudi ................ | G08G 5/21 |
| 2019/0279517 A1 * | 9/2019 | Picaut ..................... | G08G 5/54 |
| 2020/0198604 A1 | 6/2020 | Sharma | |
| 2021/0362699 A1 * | 11/2021 | Landers ................ | B64C 25/46 |

FOREIGN PATENT DOCUMENTS

| | | |
|---|---|---|
| EP | 3115267 | 1/2017 |
| EP | 3712021 | 9/2020 |

OTHER PUBLICATIONS

Combined Search and Examination Report for GB 2015397.9 mailed Feb. 24, 2021, 7 pages.
European Search Report cited in EP 21185678.6 mailed Dec. 23, 2021, 8 pages.

* cited by examiner

*Primary Examiner* — Khoi H Tran
*Assistant Examiner* — Trang Dang
(74) *Attorney, Agent, or Firm* — Nixon & Vanderhye, P.C.

(57) ABSTRACT

An aircraft system for an aircraft having a controller configured to determine, based on a criterion indicative of an aircraft condition or a runway condition, a maximum braking level able to be applied to a brake of the aircraft in an emergency braking mode, wherein the maximum braking level is determined to be a first maximum braking level when a value of the criterion is above a pre-determined threshold and a second maximum braking level when a value of the criterion is no greater than the pre-determined threshold.

26 Claims, 3 Drawing Sheets

AIRCRAFT SYSTEM

RELATED APPLICATION

This application claims priority to United Kingdom patent application GB 2015397.9, filed Sep. 29, 2020, the entirety of which is incorporated by reference.

TECHNICAL FIELD

The present invention relates to an aircraft system for an aircraft, for example an aircraft braking system.

BACKGROUND

Aircraft braking systems may operate in a first braking mode during normal operating conditions. Where one or more components of the aircraft braking system is unavailable, the aircraft braking system may operate in a degraded, so-called emergency, braking mode. In such an emergency braking mode the characteristics of the aircraft braking system may vary from the characteristics and functionality present during normal operating conditions. Typically this mode may be characterized by the lack of a closed-loop anti-skid protection function.

SUMMARY

According to a first aspect of the present invention there is provided an aircraft system for an aircraft, the aircraft system comprising a controller configured to determine, based on a criterion indicative of an aircraft condition or a runway condition, a maximum braking level able to be applied to a brake of the aircraft in an emergency braking mode.

The aircraft system according to the first aspect of the present invention may provide increased flexibility by determining an appropriate maximum braking level able to be applied to a brake of the aircraft in an emergency braking mode based on a criterion indicative of an aircraft condition or a runway condition compared to, for example, an aircraft system where the controller simply applies a single maximum braking level in the emergency braking mode irrespective of the aircraft condition or the runway condition.

The controller may be configured to set the maximum braking level. The controller may be configured to select, based on the criterion indicative of an aircraft condition or a runway condition, from a plurality of maximum braking levels, a maximum braking level able to be applied to the brake of the aircraft in the emergency braking mode. The maximum braking level may comprise a maximum pressure or torque level able to be applied to the brake of the aircraft in the emergency braking mode.

The maximum braking level may be determined to be a first maximum braking level when a value of the criterion indicative of an aircraft condition or a runway condition is above a pre-determined threshold, and a second maximum available braking level different to, for example greater than or less than, the first maximum braking level when a value of the criterion indicative of an aircraft condition or a runway condition is less than or equal to the pre-determined threshold.

The pre-determined threshold may comprise a threshold determined by theoretical and/or simulated and/or collected data. The pre-determined threshold may comprise a threshold determined by real-time data, for example data gathered in-flight of the aircraft.

The determined maximum braking level may be proportional to a difference between a value of the criterion indicative of an aircraft condition or a runway condition and the pre-determined threshold. For example, an absolute value of the determined maximum braking level may be directly proportional to an absolute value of a difference between a value of the criterion indicative of an aircraft condition or a runway condition and the pre-determined threshold. A greater variation of a value of the criterion indicative of an aircraft condition or a runway condition above the pre-determined threshold may lead to determination of a higher maximum braking level, and a greater variation of a value of the criterion indicative of an aircraft condition or a runway condition below the pre-determined threshold may lead to determination of a lower maximum braking level, or vice versa. This may provide greater flexibility in provision of a maximum braking level compared to, for example, an aircraft system where a single discrete maximum braking level is determined when a value of the criterion indicative of an aircraft condition or a runway condition is above the pre-determined threshold, and a single discrete maximum braking level is determined when the criterion indicative of an aircraft condition or a runway condition is less than or equal to the pre-determined threshold.

The determined maximum braking level may comprise a continuous spectrum of determined maximum braking levels dependent on the criterion indicative of an aircraft condition or a runway condition.

The criterion indicative of an aircraft condition or a runway condition may comprise a criterion indicative of longitudinal or vertical load experienced by landing gear wheels of the aircraft during the emergency braking mode, for example predicted or actual longitudinal or vertical load experienced by landing gear of the aircraft during the emergency braking mode. By taking into account longitudinal or vertical load experienced by landing gear of the aircraft during the emergency braking mode, greater flexibility may be provided in mitigating for the impact of forces caused by such loads, such as tyre skidding and associated tyre burst risk, for example compared to an aircraft system which provides only a single maximum pressure level during an emergency braking mode irrespective of longitudinal or vertical load experienced by landing gear of the aircraft during the emergency braking mode.

The criterion indicative of an aircraft condition or a runway condition may, for example, comprise a criterion indicative of any of a weight of the aircraft, landing gear loading during take-off or landing, wheel loading during take-off or landing, aircraft engine thrust magnitude, aircraft engine thrust direction, a flight control surface configuration, tyre condition, tyre pressure, or tyre lifespan.

When the criterion indicative of an aircraft condition or a runway condition comprises a criterion indicative of the weight of the aircraft, the maximum braking level able to be applied to the brake may comprise a first maximum braking level when the criterion indicative of the weight of the aircraft indicates a weight of the aircraft greater than a pre-determined aircraft weight, and the maximum braking level to be applied to the brake may comprise a second maximum braking level less than the first maximum braking level when the criterion indicative of the weight of the aircraft indicates a weight of the aircraft less than or equal to the pre-determined aircraft weight.

Where aircraft are forced to land before a scheduled landing, for example due to inappropriate aircraft conditions or unexpected loss of component functionality, the weight of the aircraft may be above a weight, for example a pre-determined aircraft weight, normally expected for landing. This may, for example, be due to the aircraft carrying more fuel than was expected to be carried at the time of scheduled landing. In such a condition, the energy state experienced by the aircraft during landing may be different, for example greater, compared to a situation where the weight corresponds to an expected weight for landing, due to increased vertical loading. Such level of energy may cause issues during landing, for example increasing achieved landing distance or the like. During such landings, the aircraft may enter an emergency braking mode. The present invention may enable determination of an appropriate maximum braking level able to be applied to the brake based on the weight of the aircraft during the emergency braking mode, which may improve aircraft landing performance while providing greater flexibility in mitigation of the issues experienced during landing mentioned above compared to, for example, a scenario where the maximum braking level during an emergency braking mode is independent of aircraft weight.

The criterion indicative of an aircraft condition or a runway condition may comprise a coefficient of friction of a runway to be utilised in the emergency braking mode, for example a runway along which the aircraft travels during the emergency braking mode. Thus the present invention may determine a maximum braking level able to be applied to the brake during an emergency braking mode to be based on the predicted coefficient of friction of the runway to be utilised. The coefficient of friction of the runway to be utilised may affect forces experience by the aircraft during landing, for example horizontal forces experience by landing gear of the aircraft during landing, and such forces may contribute to issues experience during landing, for example skidding or tyre bursts or the like. The present invention may enable determination of an appropriate maximum braking level able to be applied to the brake based on the coefficient of friction of the runway to be utilised during the emergency braking, which may enable greater flexibility in mitigation of the issues experienced during landing mentioned above compared to, for example, a scenario where the maximum braking level during an emergency braking mode is independent of the coefficient of friction of the runway to be utilised.

The maximum braking level able to be applied to the brake may comprise a first maximum braking level when the criterion indicative of a coefficient of friction of a runway to be utilised in the emergency braking mode indicates a coefficient greater than a pre-determined co-efficient threshold, and the maximum braking level able to be applied to the brake may comprise a second maximum braking level less than the first maximum braking level when the criterion indicative of the coefficient of friction of the runway to be utilised indicates a coefficient less than or equal to the pre-determined co-efficient threshold.

The criterion indicative of a runway condition may comprise a criterion indicative of any of a surface material of a runway to be utilised in the emergency braking mode, a wetness level of a runway to be utilised in the emergency braking mode, ambient weather conditions of the runway to be utilised in the emergency braking mode, or a length of the runway to be utilised in the emergency braking mode.

The emergency braking mode may be to be utilised in a runway procedure, the runway procedure comprising a landing procedure or a take-off procedure.

The aircraft system may comprise a hydraulically-actuated brake powered by a hydraulic accumulator in the emergency braking mode, and the maximum available braking level may comprise a maximum pressure level able to be supplied to the hydraulically-actuated brake by the hydraulic accumulator during the emergency braking mode.

Hydraulically-actuated brakes of an aircraft may be supplied by central hydraulic systems of the aircraft. In the event of reduced functionality of the central hydraulic systems, the aircraft may be required to land sooner than expected, and an emergency braking mode may be employed during such an early landing. The aircraft system of the present invention may allow flexibility of a maximum pressure level able to be supplied by the accumulator to the hydraulically-actuated brake in the emergency braking mode, with the maximum pressure level determined based on the criterion indicative of an aircraft condition or a runway condition.

The maximum pressure level may comprise a first maximum pressure level when the criterion indicative of an aircraft condition or a runway condition is above a pre-determined threshold, and a second maximum pressure level different from, for example less than, the first maximum pressure level when the criterion indicative of an aircraft condition or a runway condition is less than or equal to the pre-determined threshold.

One of the first maximum pressure level and the second maximum pressure level may be greater than or equal to 80 bar, and the other of the second maximum pressure level and the first maximum pressure level may be less than or equal to 70 bar.

The controller may be configured to determine the maximum braking level in a return-to-land procedure, for example a procedure which corresponds to an unexpected or early landing procedure. In such a return-to-land procedure, a maximum braking level to be applied may be limited, but by determining a maximum braking level based on the criterion indicative of an aircraft condition or a runway condition, the present invention may provide greater flexibility than existing systems utilised in a return-to-land procedure.

The controller may be configured to determine the maximum braking level on the basis of a status indicative of capability of one or more further aircraft systems to provide power to the brake. For example, where a capability of one or more further aircraft systems to provide power to the brake is reduced compared to normal operation, or non-existent, the controller may be configured to determine the maximum braking level based on the criterion indicative of an aircraft condition or a runway condition. This may allow the present invention to mitigate for reduced capability of one or more further aircraft systems to provide power to the brake.

The controller may be configured to determine the maximum braking level on the basis of an indication that the aircraft is in-flight or performing a take-off procedure.

According to a second aspect of the present invention there is provided an aircraft braking system comprising a brake, a braking power source, and a controller to determine, based on a criterion indicative of an aircraft condition or a runway condition, a maximum pressure able to be applied to the brake by the braking power source during emergency braking.

According to a third aspect of the present invention there is provided a method of operating an aircraft system of an aircraft, the method comprising determining, based on a criterion indicative of an aircraft condition or a runway condition, a maximum braking level able to be applied to a brake of the aircraft in an emergency braking mode.

According to a fourth aspect of the present invention there is provided a data carrier comprising machine readable instructions for the operation of a controller of an aircraft system of an aircraft to determine, based on a criterion indicative of an aircraft condition or a runway condition, a maximum braking level able to be applied to a brake of the aircraft in an emergency braking mode.

According to a fifth aspect of the present invention there is provided an aircraft comprising an aircraft system according to the first aspect of the present invention, an aircraft braking system according to the second aspect of the present invention, or a data carrier according to the fourth aspect of the present invention.

According to a sixth aspect of the present invention there is provided an aircraft system for an aircraft, the aircraft system comprising a controller configured to select, based on at least one criterion, from a plurality of maximum braking levels, a maximum braking level able to be applied to a brake of the aircraft in an emergency braking mode.

Optional features of aspects of the present invention may be equally applied to other aspects of the present invention, where appropriate.

BRIEF DESCRIPTION OF THE DRAWINGS

Embodiments of the invention will now be described, by way of example only, with reference to the accompanying drawings, in which.

DETAILED DESCRIPTION

Figure 1:
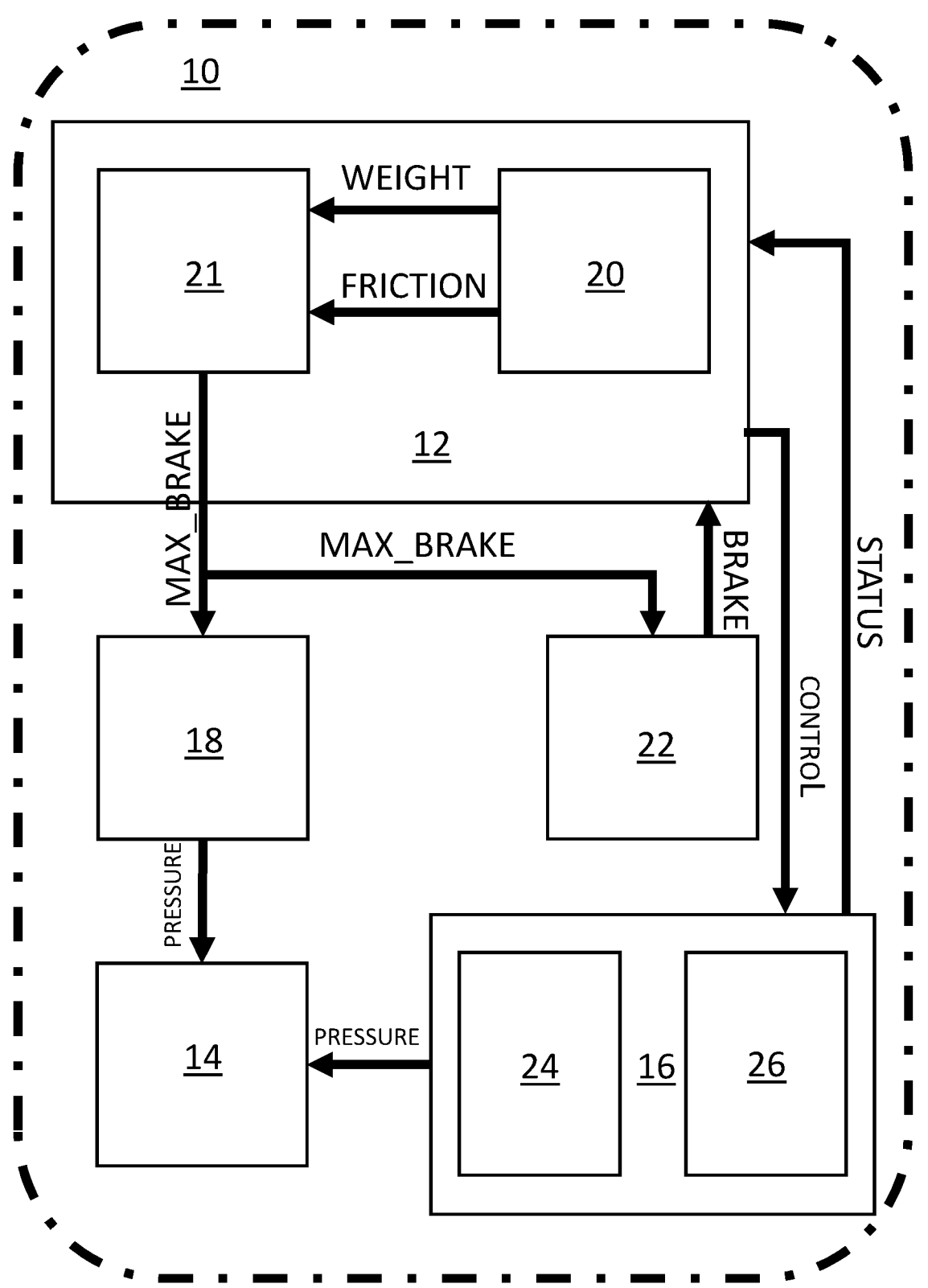
FIG. 1 shows a schematic illustration of an aircraft system according to the present invention.

An aircraft system, generally designated 10, according to the present invention is illustrated schematically in FIG. 1.

Here the aircraft system 10 is an aircraft braking system, and comprises a controller 12, a hydraulically-actuated brake 14, a central hydraulic system 16, a hydraulic accumulator 18, a condition determination module 20, a braking level module 21 and a brake pedal 22.

Figure 2:
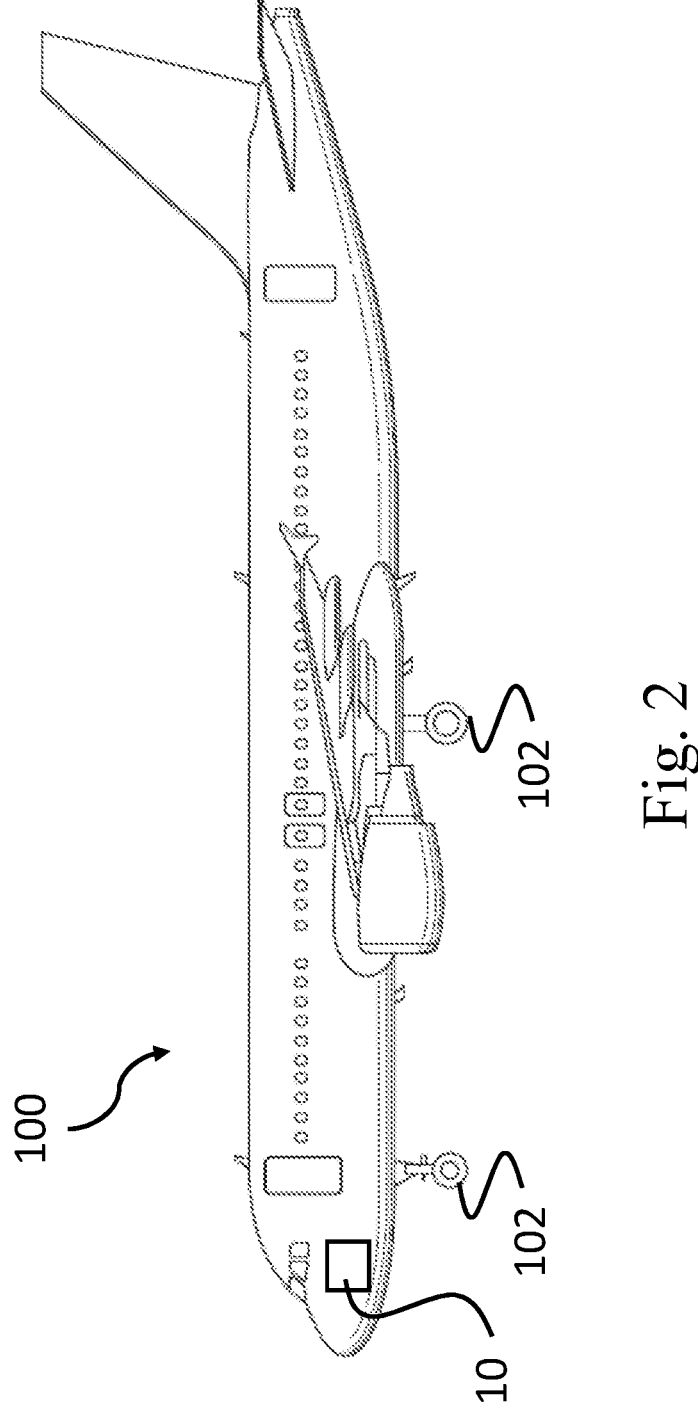
FIG. 2 shows a schematic illustration of an aircraft comprising the aircraft system of FIG. 1.

The hydraulically-actuated brake 14 is part of landing gear 102 of an aircraft 100, shown schematically in FIG. 2, to which the aircraft system 10 belongs. The hydraulically-actuated brake 14 is utilised to apply braking to the wheels of the landing gear 102 during a landing procedure. The hydraulically-actuated brake 14 may also be utilised in a take-off procedure, for example during taxiing or in the event of unexpected failure. Collectively take-off and landing procedures may be referred to as runway procedures. The central hydraulic system 16 comprises first 24 and second 26 hydraulically-actuated brake supplies, which, in normal operating conditions, act in response to depression of the brake pedal 22 and in response to the controller 12 to control operation of the hydraulically-actuated brake 14 to provide deceleration of the aircraft 100 when travelling along a runway. This is illustrated by CONTROL, BRAKE, and PRESSURE exchanged by the controller 12, the hydraulically-actuated brake 14, and the central hydraulic system 16 shown in FIG. 1. In some examples, the first 24 and second 26 hydraulically-actuated brake supplies may be independent, with one of the first 24 and second 26 hydraulically-actuated brake supplies operating in the event of incorrect functioning of the other of the second 26 and first 24 hydraulically-actuated brake supplies.

The status of the central hydraulic system 16 is communicated to the controller 12, and is illustrated by STATUS in FIG. 1. During operation of the aircraft 100, reduced functionality of the central hydraulic system 16, for example incorrect operation of the first 24 and second 26 hydraulically-actuated brake supplies, may be deemed sufficient to necessitate landing of the aircraft 100 before its intended destination. This may be referred to as a "return to land" condition. Other such return to land conditions may, for example, include other aircraft system faults, ambient weather conditions, passenger health concerns, or the like. In such a return to land condition, the hydraulic accumulator 18 may supply pressurised fluid to the hydraulically-actuated brake 14 to provide braking to wheels of the landing gear 102 during landing on a runway to decelerate the aircraft 100, for example in response to depression of the brake pedal 22, with such supply indicated by PRESSURE in FIG. 1. This operation of the hydraulic accumulator 18 may be referred to as an emergency braking mode. In conventional emergency braking modes, a maximum pressure level able to be supplied by the hydraulic accumulator 18 to the hydraulically-actuated brake 14 is limited by the controller 12, and this may also limit depression of the brake pedal 22 by a pilot of the aircraft 100. The maximum pressure level is conventionally a single maximum value.

During landing of the aircraft 100, the wheels of the landing gear 102 experience both vertical forces due, at least in part, to vertical loads caused by the remainder of the aircraft 100, and horizontal forces due, at least in part, to the runway on which the aircraft 100 is landing. Such forces can, for example, cause skidding or tyre bursts. The present invention enables determination of a maximum braking level able to be applied to the hydraulically-actuated brake 14, for example a maximum pressure level able to be provided by the hydraulic accumulator 18 to the hydraulically-actuated brake 14, based on an aircraft condition or a runway condition, which may provide greater flexibility in mitigating for the impact of forces experienced by the landing gear 102 during landing in the emergency braking mode.

In particular, the braking level module 21, shown here as part of the controller 12, determines a maximum braking level able to be applied to the hydraulically-actuated brake 14, for example a maximum pressure level able to be supplied by the hydraulic accumulator 18 to the hydraulically-actuated brake 14 in the embodiment of FIG. 1, based on an aircraft condition or a runway condition provided by the condition determination module 20, also shown as part of the controller 12. The maximum braking level is indicted by MAX_BRAKE in FIG. 1, and depression of the brake pedal 22 may also be limited in response to MAX_BRAKE.

One example of an aircraft condition is the weight of the aircraft 100. Where the aircraft 100 experiences a return to land condition, the weight of the aircraft 100 may be greater than expected during a normal landing condition, for example due to the aircraft 100 carrying more fuel than was expected to be carried at the time of landing, and the weight of the aircraft 100 may vary depending on when in a flight the return to land condition occurs. The weight of the aircraft 100 may have an impact on vertical forces experienced by wheels of the landing gear 102 during a landing procedure, and in such circumstances it may be desirable to vary the maximum braking level able to be applied to the hydraulically-actuated brake 14 dependent on the weight of the aircraft 100.

For example, where the aircraft 100 has a greater weight, the aircraft 100 may be less prone to skidding, and so a higher braking level may be utilised without risk of tyre burst. Where the aircraft 100 has a lesser weight, the aircraft 100 may be more prone to skidding and so a lower braking level may be utilised to minimise the risk of tyre burst.

Thus the condition determination module 20 in the embodiment of FIG. 1, i.e. the controller 12, determines the weight of the aircraft 100, and provides the weight of the aircraft 100 to the braking level module 21 as a signal WEIGHT, where a determination is made as to the maximum braking level able to be applied to the hydraulically-actuated brake 14, for example a maximum pressure level able to be supplied by the hydraulic accumulator 18 to the hydraulically-actuated brake 14. In some embodiments, the braking level module 21, i.e. the controller 12, selects between a number of maximum braking levels dependent on the weight of the aircraft 100. For example, in the embodiment of FIG. 1 the controller 12 determines a first maximum pressure level, of say 83 bar, where the weight of the aircraft 100 is greater than a threshold, say of 79 tons, and determines a second, lower, maximum pressure level, of say 70 bar, where the weight of the aircraft 100 is less than or equal to the threshold. Of course, it will be appreciated that the weight threshold of the aircraft 100 and the maximum pressure values provided herein are examples that may vary depending on the aircraft 100, amongst other factors.

Thus in the manner described above the braking level module 21, i.e. the controller 12, may allow for appropriate selection of maximum braking level able to be applied to the hydraulically-actuated brake 14 in the emergency braking mode, for example a maximum pressure level able to be supplied by the hydraulic accumulator 18 to the hydraulically-actuated brake 14 based on the weight of the aircraft 100. The maximum pressure level is illustrated in FIG. 1 as being provided to the accumulator 18 and the braking pedal 22 as a signal MAX_BRAKE.

In other embodiments, the maximum pressure level may depend on a magnitude of the difference between the weight of the aircraft 100 and the weight threshold. For example, a greater positive magnitude of difference between the weight of the aircraft 100 and the weight threshold may result in a higher maximum pressure level being determined by the braking level module 21, i.e. the controller 12, and a greater negative magnitude of difference between the weight of the aircraft 100 and the weight threshold may result in a lower maximum pressure level being determined by the controller 12. In such embodiments, the controller 12 may enable selection of a continuous spectrum of maximum pressure levels rather than discrete maximum pressure levels.

The condition determination module 20 in the embodiment of FIG. 1 calculates the weight of the aircraft 100 and compares the weight of the aircraft 100 to the weight threshold to determine the maximum pressure level. It will be appreciated that, in other embodiments, the weight of the aircraft 100 may be determined by other aircraft systems or the pilot of the aircraft 100 and communicated to the controller 12. Indeed, in some embodiments the weight of the aircraft 100 may be communicated indirectly to the controller 12, for example with the emergency braking mode and weight of the aircraft 100 being flagged to a pilot of the aircraft 100 on a display or the like, and the pilot of the aircraft 100 subsequently operating a switch or other input device that communicates to the braking level module 21 of the controller 12 whether to determine a first maximum pressure level or a second maximum pressure level. In such an example, an anti-skid switch used to control an anti-skid operation in a normal operating mode may be used in the emergency braking mode, when the anti-skid operation is not available, to communicate to the braking level module 21 of the controller 12 a value indicative of weight of the aircraft 100, for example whether the weight of the aircraft 100 is above or below a threshold value, such that the controller 12 is able to determine a first maximum pressure level or a second maximum pressure level. Alternatively still, the pilot may manually enter the weight, e.g. prior to take-off, into a Flight Management System, based on loading conditions.

Irrespective of where the weight of the aircraft 100 is calculated, the weight may, for example, be calculated based on an initial pre-take-off weight input to a control system by a pilot and fuel consumption in-flight.

Whilst the weight of the aircraft 100 has been discussed above as an aircraft condition upon which a maximum braking level may be determined, other aircraft conditions may additionally or alternatively form part of the determination of maximum braking level. Indeed, any aircraft condition that has an impact on forces experienced by the landing gear 102 of the aircraft 100 during landing in an emergency braking mode may form part of the determination of maximum braking level. A non-exhaustive list of aircraft conditions is any of aircraft weight, landing gear loading during take-off or landing, wheel loading during take-off or landing, aircraft engine thrust magnitude, aircraft engine thrust direction, a flight control surface configuration, tyre condition, tyre pressure, or tyre lifespan.

Another example of an aircraft condition may comprise a condition or availability of a braking and steering control unit of the aircraft 100, for example with a lower maximum braking level determined where the braking and steering control unit is not available.

In the embodiment of FIG. 1, the determination of the maximum braking level able to be applied to the hydraulically-actuated brake 14 during the emergency braking mode is also based on a runway condition, namely an actual or predicted coefficient of friction of the runway on which the aircraft 100 lands when utilising the emergency braking mode. The coefficient of friction of the runway may have an impact on horizontal forces experienced by wheels of the landing gear 102 during a landing procedure, and in such circumstances it may be desirable to vary the maximum braking level able to be applied to the hydraulically-actuated brake 14 in the emergency braking mode dependent on the coefficient of friction of the runway.

For example, where the runway has a higher coefficient of friction, the aircraft 100 may be less prone to skidding, and so a higher braking level may be utilised without risk of tyre burst. Where the runway has a lower coefficient of friction, the aircraft may be more prone to skidding and so a lower braking level may be utilised to minimise the risk of tyre burst.

Thus the condition determination module 20 in the embodiment of FIG. 1, i.e. the controller 12, provides a coefficient of friction of the runway to be used in a landing procedure when in emergency braking mode to the braking level module 21 of the controller 12, in the form of the signal FRICTION in FIG. 1. In response to the coefficient of friction of the runway, the braking level module 21 of the controller 12 determines a maximum braking level able to be applied to the hydraulically-actuated brake 14 in the emergency braking mode, for example a maximum pressure level able to be supplied by the accumulator 18 to the hydraulically-actuated brake 14. It will be appreciated that the coefficient of friction may be an actual calculated value given material and surface water conditions, or may be a predicted value given current weather conditions at the time of landing.

In the embodiment of FIG. 1, the controller 12 selects between a number of maximum braking levels dependent on the coefficient of friction of the runway. For example, in the embodiment of FIG. 1 the controller 12 determines a first maximum pressure level, of say 83 bar, where the coefficient of friction is greater than a threshold, and determines a second, lower, maximum pressure level, of say 70 bar, where the coefficient of friction is less than or equal to the threshold. Of course, it will be appreciated the maximum pressure values provided herein are examples that may vary depending on the aircraft 100.

Thus in the manner described above the controller 12 may allow for appropriate selection of maximum braking level able to be applied to the hydraulically-actuated brake 14 in the emergency braking mode, for example a maximum pressure level able to be supplied by the hydraulic accumulator 18 to the hydraulically-actuated brake 14 based on the coefficient of friction of the runway on which the aircraft 100 lands when operating in an emergency braking mode.

Similar to the discussion above in relation to determination of maximum braking level based on the weight of the aircraft 100, in other embodiments, the maximum braking level may depend on a magnitude of the difference between the coefficient of friction and the threshold. For example, a greater positive magnitude of difference between the coefficient of friction and the threshold may result in a higher maximum pressure level being determined by the controller 12, and a greater negative magnitude of difference between the coefficient of friction and the threshold may result in a lower maximum pressure level being determined by the controller 12. In such embodiments, the controller 12 may enable selection of a continuous spectrum of maximum pressure levels rather than discrete maximum pressure levels.

Furthermore, and similar to the discussion above in relation to determination of maximum braking level based on the weight of the aircraft 100, in other embodiments, the coefficient of friction may be determined by other aircraft systems and communicated to the controller 12. The controller 12 may become aware of the coefficient of friction through manual input of the coefficient of friction by the pilot, manual input of an identifier of the runway to be used by the pilot followed by a lookup/query with a database or remote resource on current conditions at the runway, or automatically through selection of the runway by a remote service (for example air traffic control (ATC)) and communication of the coefficient of friction to the controller by the ATC.

Whilst the coefficient of friction of the runway has been discussed above as a runway condition upon which a maximum braking level may be determined, other runway conditions may additionally or alternatively form part of the determination of maximum braking level. Indeed, any runway condition that has an impact on forces experienced by the landing gear 102 of the aircraft 100 during landing in an emergency braking mode, or an impact on desired braking characteristics during emergency landing mode, may form part of the determination of maximum braking level. A non-exhaustive list of runway conditions is any of a surface material of a runway to be utilised in the emergency braking mode, a wetness level of a runway to be utilised in the emergency braking mode, ambient weather conditions of the runway to be utilised in the emergency braking mode, or a length of the runway to be utilised in emergency braking mode.

Figure 3:
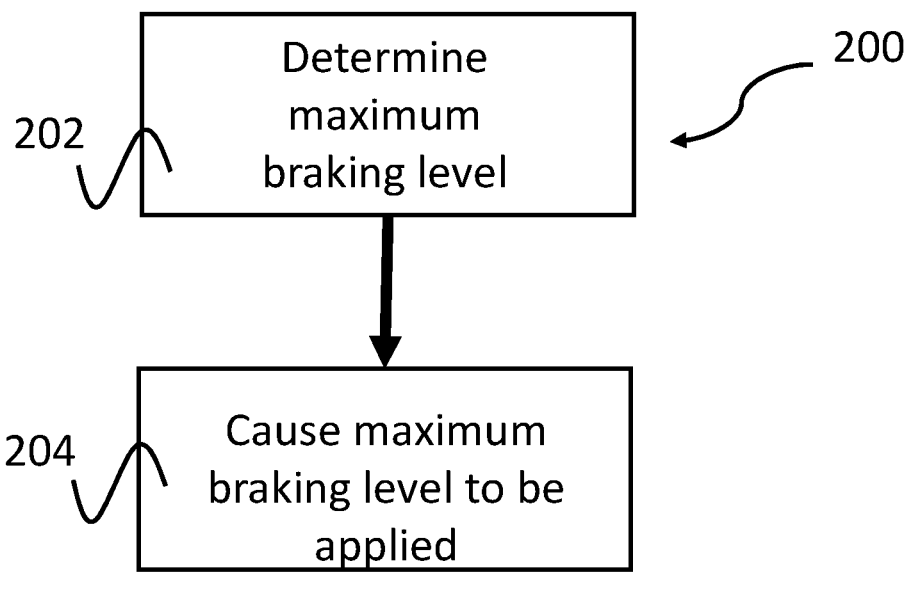
FIG. 3 is a flow diagram illustrating a method according to the present invention.

A method 200 according to the present invention is illustrated schematically in the flow diagram of FIG. 3. The method 200 comprises determining 202, based on a criterion indicative of an aircraft condition or a runway condition, a maximum braking level able to be applied to the hydraulically-actuated brake 14 of the aircraft 100 in an emergency braking mode, and causing 204 the maximum braking level to be applied to the hydraulically-actuated brake 14 during the emergency braking mode.

Figure 4:
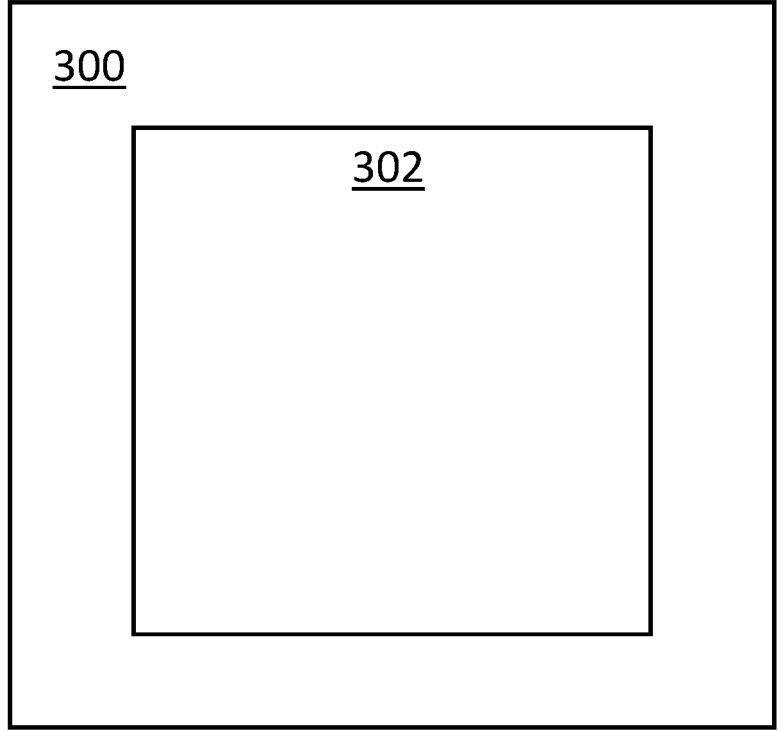
FIG. 4 is a schematic illustration of a data carrier according to the present invention.

A data carrier 300 according to the present invention is illustrated schematically in FIG. 4. The data carrier comprises machine readable instructions 302 that cause operation of the controller 12 of the aircraft system 10 of the aircraft 100 to determine, based on a criterion indicative of an aircraft condition or a runway condition, a maximum braking level able to be applied to the hydraulically-actuated brake 14 in an emergency braking mode.

The braking level module 21 of the controller 12 of the embodiment of FIG. 1 has been described above as utilising both the weight of the aircraft 100 and the coefficient of friction of the runway, i.e. both an aircraft condition and a runway condition, in the determination of the maximum braking level to be applied to the hydraulically-actuated brake 14 during the emergency braking mode. In other embodiments only one of an aircraft condition and a runway condition may be utilised by the braking level module 21 of the controller 12, for example only one of a weight of the aircraft 100 or a coefficient of friction of the runway.

Furthermore, whilst the aircraft system 10 of the embodiment of FIG. 1 has a hydraulically-actuated brake 14, it will be recognised that the teachings herein are generally applicable to brakes of other type, for example electric braking systems or the like. Hence more generally aircraft braking systems according to the present invention may be thought of as comprising a brake, a braking power source, and a controller to determine, based on a criterion indicative of an aircraft condition or a runway condition, a maximum pressure able to be applied to the brake by the braking power source in an emergency braking mode.

Whilst described above in relation to a landing procedure, it will be apparent that the controller 12 may also determine, based on a criterion indicative of an aircraft condition or a runway condition, a maximum braking level able to be applied to the hydraulically-actuated brake 14 of the aircraft 100 in an emergency braking mode during a take-off procedure. More generally, the aircraft system 10 may operate in the manner described above in any runway procedure, i.e. any procedure in which the aircraft is travelling on a runway where a braking procedure may be required.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft system for an aircraft, the aircraft system comprising a controller configured to determine, based on a criterion indicative of an aircraft condition or a runway condition, a maximum braking level that the aircraft system is able to apply to a brake of the aircraft in an emergency braking mode, wherein the maximum braking level is determined to be a first maximum braking level when a value of the criterion is greater than a pre-determined threshold, and a second maximum braking level different to the first maximum braking level when a value of the criterion is no greater than the pre-determined threshold, wherein the controller is configured to determine the first and second maximum braking levels while the aircraft is in-flight and before the controller determines the maximum braking level, and the controller is configured to limit a level of braking that can be applied to the brake by the aircraft system to the maximum braking level in the emergency braking mode.

2. The aircraft system according to claim 1, wherein the first maximum braking level and the second maximum braking level are each proportional to a difference between the value of the criterion and the pre-determined threshold.

3. The aircraft system according to claim 1, wherein the criterion comprises a criterion indicative of longitudinal or vertical load experienced by landing gear of the aircraft during the emergency braking mode.

4. The aircraft system according to claim 1, wherein the criterion comprises a criterion indicative of a weight of the aircraft.

5. The aircraft system according to claim 1, wherein the criterion comprises a criterion indicative of a coefficient of friction of a runway to be utilized in the emergency braking mode.

6. The aircraft system according to claim 1, wherein the emergency braking mode is to be utilized in a landing procedure.

7. The aircraft system of claim 1, wherein the brake comprises a hydraulically-actuated brake powered by a hydraulic accumulator in the emergency braking mode, wherein the first maximum braking level comprises a first maximum pressure level able to be supplied to the hydraulically-actuated brake by the hydraulic accumulator during the emergency braking mode, and wherein the second maximum braking level comprises a second maximum pressure level able to be supplied to the hydraulically-actuated brake by the hydraulic accumulator during the emergency braking mode.

8. The aircraft system according to claim 7, wherein the first maximum pressure level is at least 80 bar, and the second maximum pressure level is no greater than 70 bar.

9. The aircraft system according to claim 1, wherein the controller is configured to determine the first and second maximum braking levels in a return-to-land procedure.

10. The aircraft system according to claim 1, wherein the controller is configured to determine the first and second maximum braking levels based on a status indicative of capability of one or more further aircraft systems to provide power to the brake.

11. The aircraft system of claim 1, wherein the emergency brake mode includes a closed-loop anti-skid feature of the brake which is not properly functioning.

12. The aircraft system of claim 1, wherein the controller is configured to limit a range of depression of a brake pedal in the aircraft based on the maximum braking level.

13. The aircraft system of claim 1, wherein the criterion indicates both a weight of the aircraft and a runway coefficient of friction, and the controller is configured to select the first maximum braking level or the second maximum braking level based on the criterion indicating the weight of the aircraft and the runway coefficient of friction.

14. An aircraft braking system comprising:

a brake, a braking power source, and a controller configured to determine, based on a criterion indicative of an aircraft condition or a runway condition, a maximum pressure level that the braking power source is able to apply to the brake during an emergency braking mode, wherein the maximum pressure level is determined to be a first maximum pressure level when a value of the criterion is greater than a pre-determined threshold, and a second maximum pressure level different to the first maximum pressure level when a value of the criterion is no greater than the pre-determined threshold, wherein the controller is configured to determine the first and second maximum pressure levels while the aircraft is in-flight and before the controller determines the maximum pressure level, and wherein the controller is configured to limit a level of pressure that can be applied by the braking power source to the brake to the maximum pressure level during the emergency braking mode.

15. The aircraft system of claim 14, wherein the emergency brake mode includes a closed-loop anti-skid feature of the brake which is not properly functioning.

16. The aircraft system of claim 14, wherein the controller is configured to limit a range of depression of a brake pedal in the aircraft based on the maximum braking level.

17. The aircraft system of claim 14, wherein the criterion indicates both a weight of the aircraft and a runway coefficient of friction, and the controller is configured to select the first maximum braking level or the second maximum braking level based on the criterion indicating the weight of the aircraft and the runway coefficient of friction.

18. A method of operating an aircraft system of an aircraft, the method comprising:

determining, based on a criterion indicative of an aircraft condition or a runway condition, a maximum braking level able to be applied to a brake by a brake power source while the aircraft is in an emergency braking mode, and limiting a level of braking that can be applied to the brake by the brake power source to the maximum braking level in the emergency braking mode, wherein the maximum braking level is determined to be a first maximum braking level when a value of the criterion is greater than a pre-determined threshold, and a second maximum braking level different to the first maximum braking level when a value of the criterion is no greater than the pre-determined braking threshold, and wherein the determining of the first and second maximum braking levels is performed while the aircraft is in-flight and before the determining of the maximum braking level.

19. The method of claim 18, further comprising determining the emergency mode based on a lack of functioning of a closed-loop anti-skid feature of the brake.

20. The method of claim 18, further comprising limiting a range of depression of a brake pedal in the aircraft based on the maximum braking level.

21. The method of claim 18, further comprising determining the first braking level and the second braking level based on a weight of the aircraft and a runway coefficient of friction.

22. A non-transitory data storage device comprising machine readable instructions for operation of a controller of an aircraft system of an aircraft to determine, based on a criterion indicative of an aircraft condition or a runway condition, a maximum braking level able to be applied to a brake of the aircraft by a power source during an emergency braking mode of the aircraft, wherein the maximum braking level is determined to be a first maximum braking level when a value of the criterion is greater than a pre-determined threshold, and a second maximum braking level different to the first maximum braking level when a value of the criterion is no greater than the pre-determined threshold, wherein the controller is configured to determine the first and second maximum braking levels while the aircraft is in-flight and before the determination of the maximum braking level, and wherein the controller is configured to limit a level of braking that can be applied to the brake by the power source for the brake to the maximum braking level during the emergency braking mode.

23. An aircraft system for an aircraft, the aircraft system comprising a controller configured to select, based on at least one criterion, and from a plurality of previously determined maximum braking levels, a maximum braking level that the aircraft system is able to apply to a brake of the aircraft in an emergency braking mode, wherein the maximum braking level is determined to be a first maximum braking level when a value of the criterion is greater than a pre-determined threshold, and a second maximum braking level different to the first maximum braking level when a value of the criterion is no greater than the pre-determined threshold, wherein the controller is configured to determine the first and second maximum braking levels while the aircraft is in-flight, wherein the controller is configured to limit a level of braking that can be applied to the brake by the aircraft system to the maximum braking level in the emergency braking mode, and wherein the at least one criterion is indicative of an aircraft condition or a runway condition.

24. The aircraft system of claim 23, wherein the emergency brake mode includes a non-functioning closed-loop anti-skid feature of the brake.

25. The aircraft system of claim 23, wherein the emergency brake mode limits a range of depression of a brake pedal in the aircraft based on the maximum braking level.

26. The aircraft system of claim 23, wherein the controller is configured to determine the first braking level and the second braking level each based on a weight of the aircraft and a runway coefficient of friction.

* * * * *